United States Patent [19]
Kelley

[11] Patent Number: 5,142,933
[45] Date of Patent: Sep. 1, 1992

[54] MOTION TRANSMITTING REMOTE CONTROL ASSEMBLY HAVING CONDUIT LENGTH ADJUSTER

[75] Inventor: Dixon L. Kelley, New Baltimore, Mich.

[73] Assignee: Teleflex Incorporated, Limerick, Pa.

[21] Appl. No.: 704,614

[22] Filed: May 23, 1991

[51] Int. Cl.⁵ .............................................. F16C 1/10
[52] U.S. Cl. ........................... 74/502; 74/501.5 R; 403/197; 192/111 A
[58] Field of Search ............ 74/500.5, 501.5 R, 501.6, 74/502.2, 502.4, 502.6; 403/197, 196, 105; 188/77 W, 67; 192/111 A

[56] References Cited

U.S. PATENT DOCUMENTS

| | | | |
|---|---|---|---|
| 3,427,894 | 2/1969 | Tschanz | 74/501 |
| 3,662,617 | 5/1972 | Bennett et al. | 74/501 R |
| 3,665,784 | 5/1972 | Bennett | 74/501 |
| 3,710,645 | 1/1973 | Bennett | 74/501 P |
| 4,175,450 | 11/1979 | Bennett | 64/501 P |
| 4,610,180 | 9/1986 | Spease | 74/501.5 R |
| 4,658,668 | 4/1987 | Stocker | 74/501.5 R |
| 4,669,330 | 6/1987 | Stocker | 74/501.5 R |
| 4,688,445 | 8/1987 | Spease et al. | 74/501 R |
| 4,694,706 | 9/1987 | Lichtenberg et al. | 74/501.5 R |
| 4,841,806 | 6/1989 | Spease | 74/501.5 R |
| 4,854,185 | 8/1989 | Lichtenberg et al. | 74/501.5 R |

Primary Examiner—Richard Lorence
Assistant Examiner—Winnie Yip
Attorney, Agent, or Firm—Reising, Ethington, Barnard, Perry & Milton

[57] ABSTRACT

A motion transmitting remote control assembly (10,10′,10″) includes a flexible conduit (12,12′,12″) and a flexible core element (16,16′,16″) movably supported by the conduit (12,12′,12″). A slider member (26,26′,26″) is fixedly attached to either the conduit (12,12′,12″) or the core element (16,16′,16″), depending upon whether the application is a length adjustable conduit (12,12′,12″) or a length adjustable core element (16,16′,16″). A support member (18,18′,18″) slideably supports the slider member (26,26′,26″) while preventing rotational movement therebetween. A locking member (38,38′,38″) is continuously biased toward locking engagement with the slider member (26,26′,26″) by a spring (50,50′,50″). A lever (86,86′,86″) is pivotally connected to the support member (18,18′,18″) and is moveable between a first portion in which the lever (86,86′,86″) depresses the locking member (38,38′,38″) against the spring (50,50′,50″) and thereby maintains the locking member (38,38′,38″) disengaged from the slider member (26,26′,26″) and a second position in which the lever (86,86′,86″) is positioned free from interaction with the locking member (38,38′,38″).

15 Claims, 3 Drawing Sheets

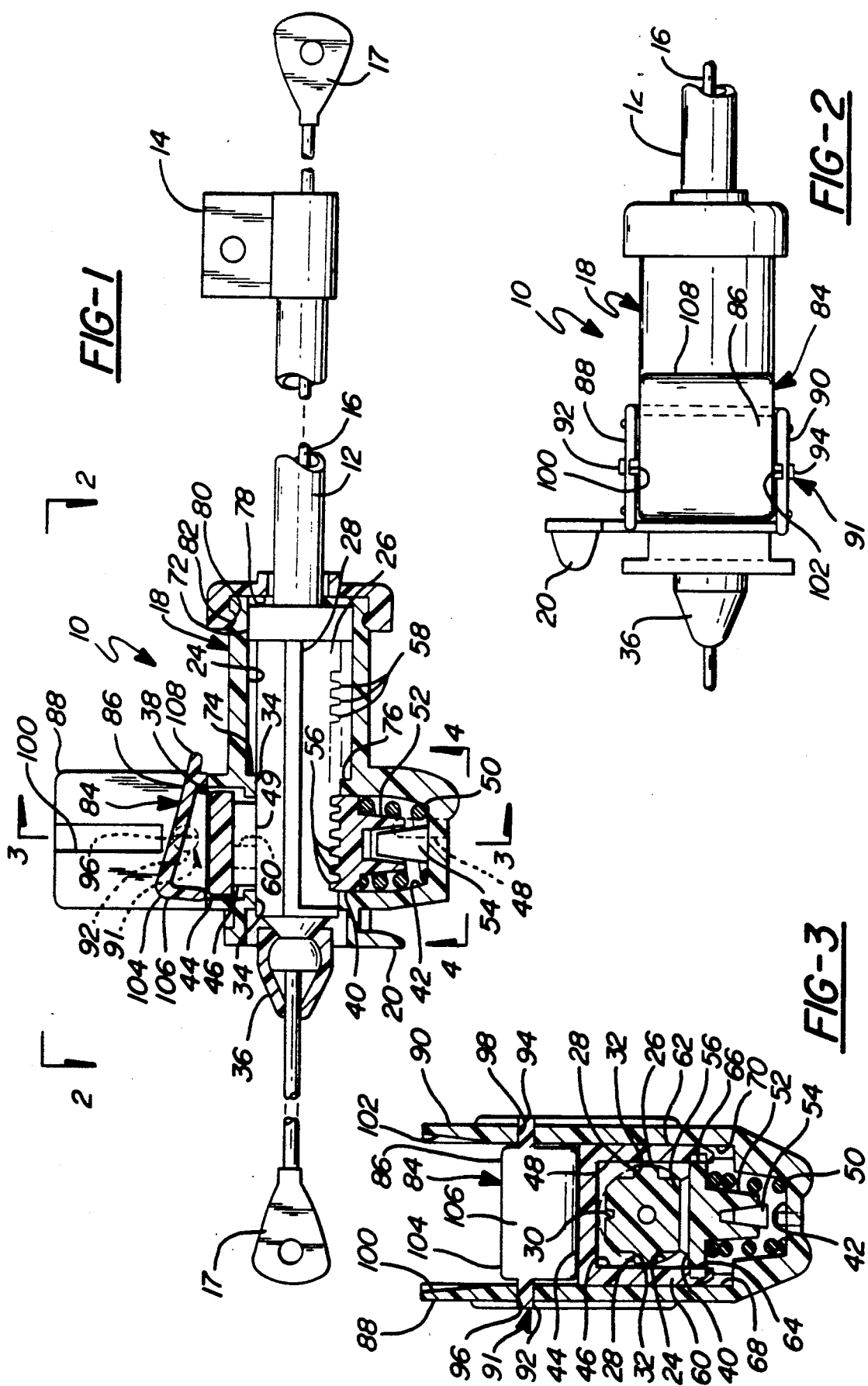

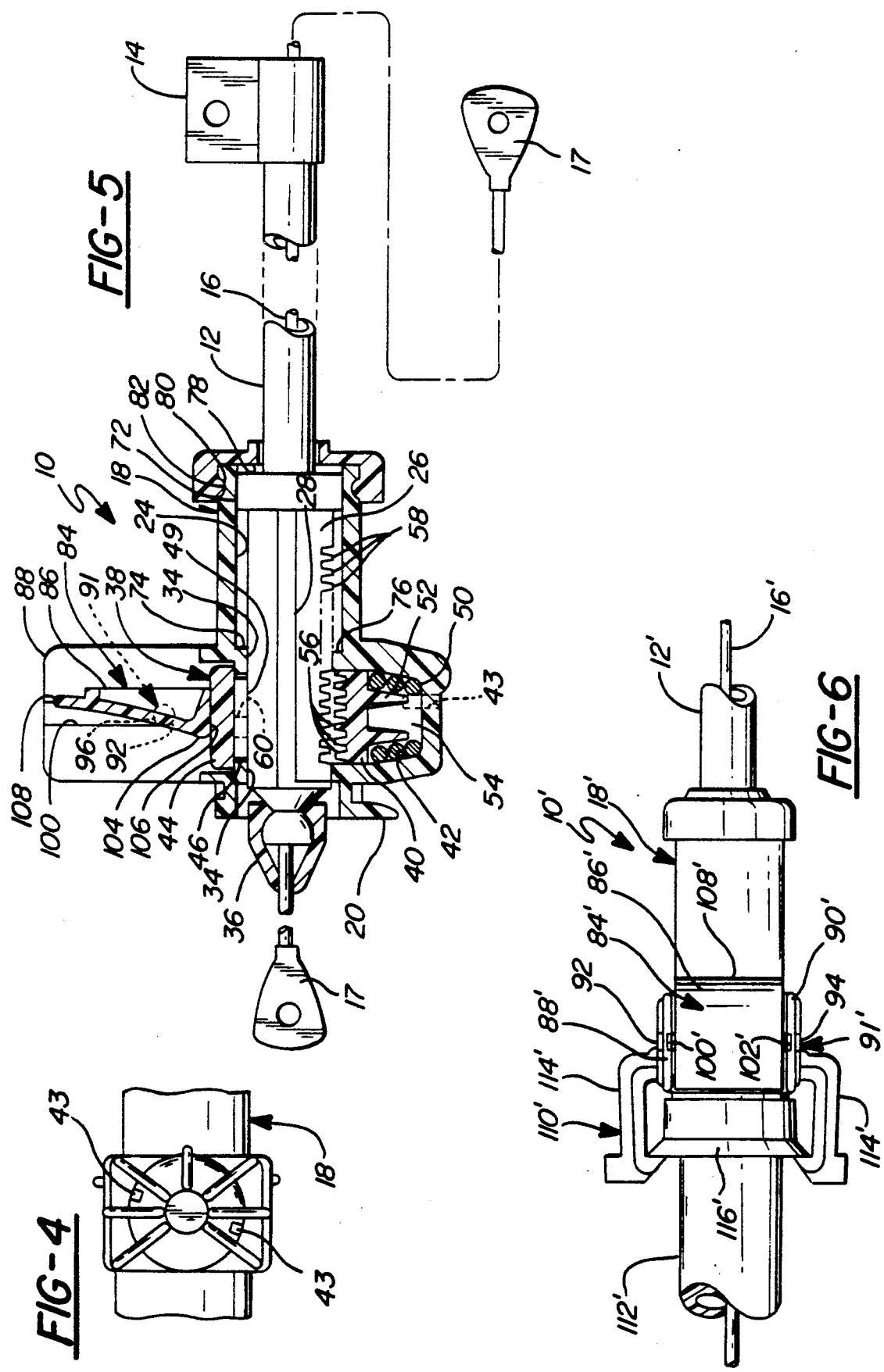

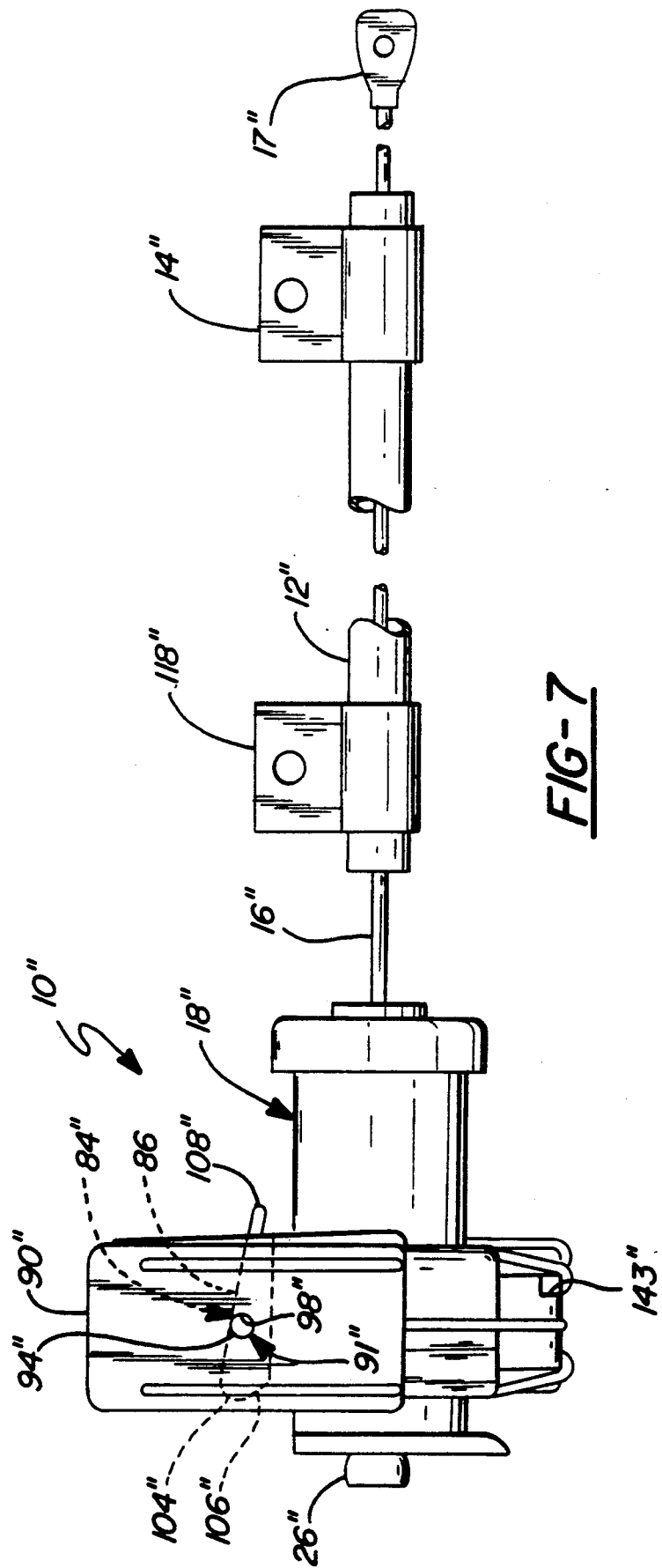

MOTION TRANSMITTING REMOTE CONTROL ASSEMBLY HAVING CONDUIT LENGTH ADJUSTER

BACKGROUND OF THE INVENTION

1. Field of the Invention

The instant invention relates to a motion transmitting remote control assembly of the type wherein motion is transmitted in a curved path by a flexible motion transmitting core element movably supported by a flexible conduit.

2. Description of the Prior Art

After installation of a typical remote control assembly, it is frequently desirable to adjust the distance of the core element extends from the end of the conduit in order to remove slack in the core element and achieve a proper connection This can be done by either changing the effective length of a conduit (and thus the travel path of the core element) or, alternatively, the core element itself Many conduit length adjust systems are known to the art which employ a support member for slideably supporting the conduit and a spring-biased locking member continuously urged into locking engagement with the conduit to control the relative sliding movement between the conduit and the support member. With most all of these systems, coacting ratcheting locking teeth are provided on the locking member and conduit to enable sliding movement of the conduit relative to the support member in one direction only. This permits either lengthening or, alternatively, shortening of the conduit depending upon the orientation of the locking teeth. Examples of such systems are disclosed in U.S. Pat. Nos. 3,662,617, granted May 16, 1972; 3,710,645, granted Jan. 16, 1973; and 4,175,450, granted Nov. 27, 1979; all in the name of William G. Bennett and assigned to the assignee of the present invention. Still, other examples of systems of this type are disclosed in U.S. Pat. Nos. 4,841,806, granted Jun. 27, 1989 and 4,688,445, granted Aug. 25, 1987, both in the name of Arthur L. Spease and both of which are assigned to the assignee of the present invention.

With these types of systems, it is also desirable to include a means for resetting or readjusting the adjustment device for conditions of over-adjustment or servicing. For example, the aforementioned Spease '445 patent teaches providing a button which, when manually depressed by the operator, moves the locking member out of engagement with the conduit. This permits the conduit to be moved within the support member in the direction normally prevented by the locking teeth to achieve readjustment However, this system requires the use of a rather stiff spring in order to assure that the assembly remains in the adjusted condition (i.e., that the locking member remains firmly engaged with the conduit). Consequently, readjustment is difficult since the force of the stiff spring must be overcome by the operator.

Another example of such a system is disclosed in the U.S. Pat. No. 4,694,706, granted Sep. 22, 1987 to Lichtenberg et al. This system, however, requires that the conduit be rotated within the support member in order to achieve readjustment. Permitting rotation between the conduit and the support member is undesirable since inadvertent rotation would result in disengagement of the teeth.

Examples of other conduit length adjusting devices are disclosed in the U.S. Pat. Nos. 4,658,668 to Stocker, granted Apr. 21, 1987; 4,669,330 to Stocker, granted Jun. 2, 1987; and 4,854,185 to Lichtenberg et al, granted Aug. 8, 1989. The Stocker '668 and Lichtenberg et al '185 devices are manual-adjust type and do not include a spring-biased locking member, and the Stocker '330 device is biased toward a disengaged condition.

An example of a core element length adjusting device is disclosed in the U.S. Pat. No. 3,665,784 to Bennett, granted May 30, 1972 and assigned to the assignee of the present invention With this device, the core element and support member (i.e., the terminal) are continuously biased into engagement with one another.

SUMMARY OF THE INVENTION AND ADVANTAGES

A motion transmitting remote control assembly according to the present invention includes a conduit, a motion transmitting core element movably supported by the conduit, a slider member fixedly secured to either the conduit or the core element, and support means for slideably supporting the slider member and the core element while preventing relative rotational movement therebetween. The invention further includes locking means for controlling the longitudinal sliding movement of the slider member relative to the support member. The locking means is movable between an engaged condition in which the locking means is engaged with the slider member for preventing relative sliding movement therebetween in at least one direction and a disengaged condition in which the locking means is disengaged from the slider member for permitting relative sliding movement therebetween in both directions. Biasing means act on the locking means for continuously urging the locking means toward the engaged condition. The invention is characterized by disengaging means for acting against the biasing means to maintain the locking means in the disengaged condition independent of the application of any external forces to the assembly.

An advantage of the present invention is that the disengaging means acts to selectively maintain the locking means out of engagement with the slider member without requiring a continued application of force to the locking means by an operator in opposition to the biasing means. Once positioned, adjustment and readjustment in the length of the conduit or, alternatively, the core element (depending upon the particular application) can be made until the desired length is achieved After the proper adjustments have been made, the operator simply moves the disengaging means free from interaction with the locking means and thus free from opposition to the biasing means to permit engagement of the locking means with the slider member to lock the assembly in its properly adjusted state. The installation of the subject invention is less labor intensive, less costly and less involved than with conventional adjustable assemblies known to the art.

BRIEF DESCRIPTION OF THE DRAWINGS

FIG. 1 is a cross-sectional view of a preferred embodiment of the subject invention showing the locking member in the engaged condition;

FIG. 2 is a top view taken substantially along line 2—2 of FIG. 1;

FIG. 3 is a cross-sectional view taken substantially along line 3—3 of FIG. 1;

FIG. 4 is a bottom view taken substantially along line 4—4 of FIG. 1;

FIG. 5 is a view like FIG. 1 but with the locking member shown in the disengaged condition;

FIG. 6 is a top view of an alternative mid-conduit adjustment device; and

FIG. 7 is another alternative embodiment of the present invention shown being used as a core element length adjustor

DETAILED DESCRIPTION OF THE PREFERRED EMBODIMENT

A motion-transmitting remote control assembly constructed in accordance with the subject invention is generally shown at 10 in the Figures. The assembly 10 includes a flexible conduit 12. The conduit 12 is preferably of the well-known type including an inner tubular member made of organic polymeric material and surrounded by a plurality of long lay wires disposed helically thereabout with a casing of organic polymeric material disposed about the long lay wires and about the inner tubular member. A fitting 14 is attached to one end of the conduit 12 and is adapted by a flange with a hole therein for attachment of the conduit to a support structure, such as the body of a vehicle.

A flexible, motion-transmitting core element 16 is movably supported by the conduit 12 with the ends of the core element 16 extending from the ends of the conduit 12. The motion-transmitting core element 16 is either a wire member, as illustrated, or a plurality of metal strands helically wound together in cable-like fashion A coupling member or terminal 17 of the well-known type is disposed about the end of the core element 16 for attachment of the core element 16 to an operated or operating member. The opposite end of the core element 16 may include a similar terminal member 17.

The assembly also includes a support means or member, generally indicated at 18. The support member 18 is adapted for attachment to a support structure by snap-in connection means 20. The snap-end connection means 20 may be of the slide and snap type or of the push and snap type forming the subject matter of U.S. Pat. No. 3,427,894, granted to August Tschanz on Feb. 18, 1969, and assigned to the assignee of the present invention.

The support member 18 includes a passageway 24 extending completely through the support member 18 between opposite ends thereof. The conduit 12 includes a slider member 26 slideably supported within the passageway 24 of the support member 18. The slider member 26 is preferably of a rigid, organic polymeric material fixedly molded about the plastic exterior of the conduit 12. The slider member 26 includes shoulders 28 formed on either side of the slider member 26. The slider member 26 further includes an elongated slot 30 formed on the upper surface of the slider member 26. The slot 30 and shoulders 28 extend parallel to the longitudinal axis of the slider member 26. The support member 18 presents shoulders 32 projecting from the support member 18 into the passageway 24 and extending parallel to the longitudinal axis of the passageway 24. The support member 18 further includes an elongated ridge 34 projecting from the top of the passageway 24 and extending parallel to the longitudinal axis of the passageway 24. The shoulders 28 of the slider member 26 abut the shoulders 32 of the support member 18, and the ridge 34 is received in the slot 30 to provide support and stability to the assembly 10 so as to prevent relative rotational movement between the slider member 26 and the support member 18 at all times.

A swivelling dust cover or wiper element 36 is supported by a swivel socket on the end of the slider member 26.

The assembly 10 includes locking means 38 for controlling the longitudinal movement of the slider member 26 relative to the support member 18. The locking means 38 is preferably an integral member having a locking portion 40 disposed within a cavity 42 formed in the support member 18. The cavity 42 includes drain holes 43 for allowing moisture to drain from the cavity 42. The locking means 38 further includes a button 44 disposed on the opposite side of the slider member 26 with respect to the locking portion 40. A pair of tabs 46, 48 extend downwardly from the button 44 on opposite side edges of the slider member 26 and are connected to the locking portion 40. The button 44, tabs 46, 48 and locking portion 40 thus define an aperture 49 surrounding the slider member 26 to allow longitudinal movement of the slider member 26 therethrough.

Each of the tabs 46, 48 is provided with a rib 60, 62 formed on the outer surface of the tabs 46, 48 opposite the aperture 49. The ribs 60, 62 extend a short distance beyond the tabs 46, 48 and engage notches 64, 66 formed in the sides of the locking portion 40 to thereby interconnect the button 44, tabs 46, 48 and locking portion 40. The support member 18 has two grooves 68, 70 adjacent the tabs 46, 48 in which the ribs 60, 62 are received for slideably guiding the locking mean 38.

The locking means 38 is moveable between an engaged condition (FIG. 1) in which the locking portion 40 of the locking means 38 is engaged with the slider member 26 for preventing relative sliding movement therebetween and at least on direction and a disengaged condition (FIG. 5) in which the locking portion 40 of the locking means 38 is disengaged from the slider member 26 for permitting relative sliding movement therebetween in both longitudinal directions.

The assembly 10 includes biasing means 50, comprising a coil spring 50, disposed in the cavity 42 and reacting between the support member 18 and the locking portion 40 of the locking means 38 for continuously urging the locking means 38 toward the engaged condition. More specifically, the locking means 38 has a stem 52 provided with the temperature responsive slug 54 extending downwardly from the underside of the locking portion 40 into the cavity 42, with the spring 50 disposed about the slug 54 and stem 52 to react between the bottom of the cavity 42 and the underside of the locking portion 40, to continuously urge the locking portion 40 into engagement with the underside of the slider member 26. The locking portion 40 and slider member 26 are each provided with a plurality of coacting locking teeth 56, 58 to control the movement of the slider member 26 within the support member 18. The coacting locking teeth 56, 58 are preferably of the square type which, when engaged, prevent relative movement between the slider member 26 and the support member 18 in both directions. Thus, when the locking means 38 is positioned in the engaged position with the locking teeth 56 of the locking portion 40 coacting with the locking teeth 58 formed on the underside of the slider member 26 as shown in FIG. 1, the slider member 26 is prevented from moving longitudinally within the passageway 24 of the support member 18.

Disengagement of the locking means 38 from the slider member 26 is accomplished by depression of the button 44 which moves the locking portion 40 of the locking means 38 out of engagement with the slider member 26 for enabling longitudinal movement of the slider member 26 in either longitudinal direction relative to the support member 18. The spring 50 and temperature responsive slug 54 are compressed between the underside of the locking portion 40 and the bottom of the cavity 42 upon disengaging movement of the locking means 38. The temperature responsive slug 54 reacts between the support member 18 and the underside of the locking portion 40 in parallel with the spring 50 for allowing movement of the locking means 38 in response to a predetermined force in a predetermined temperature range and for requiring higher forces to move the locking means 38 than the predetermined force at temperatures out of the predetermined temperature range. The operation of the slug 54 may be of the type forming the subject matter of U.S. Pat. No. 4,331,041 granted to William G. Bennett on May 25, 1982 and assigned to the assignee of the subject invention. Specifically, the slug, 54 would allow normal operation of the locking means 38 in a normal ambient temperature range but would offer greater resistance to the movement of the locking means 38 as temperatures fall below that temperature range. By way of example, the slug 54 may have no effect upon the locking means 38 in its coaction with the spring 50 during assembly at an automotive plant to obtain the desired adjusted length of the conduit 12. However, should the automobile be subjected to colder temperatures, the slug 54 would become more resistive and would require a greater force to move the locking means 38 thereby preventing inadvertent adjustment in the length of the conduit 12 to an undesired position.

The slider member 26 is provided with a collar 72 which coacts with shoulders 74, 76 extending into the passageway 24 from the support member 18 to limit the distance the slider member 26 can travel into the passageway 24 of the support member 18. The collar 72 also coacts with a cap 78 disposed on the end of the support member 18 attached to the conduit for preventing the removal of the slider member 26 from the support member 18 once assembled. The cap 78 is provided with an inner annular rib 80 for connection with an outer annular groove 82 formed on the end of the support member 18. The rib 80 and groove 82 provide a snap-on connection of the cap 78 to the support member 18.

The assembly 10 further includes disengaging means, generally shown at 84, for acting against the biasing means 50 to maintain the locking means 38 in the disengaged condition (FIG. 5) independent of the application of any external forces to the assembly 10, such as a force applied to the button 44 by an operator to move the locking means 38 from the engaged position (FIG. 1) to the disengaged position (FIG. 5). The disengaging means 84 thus provides a means for maintaining the locking means 38 out of engagement with the slider member 26 without requiring an operator to apply an external force to the assembly 10 (i.e., continuously depressing the button 44) in opposition to the spring 50, which is acting to continuously oppose depression of the button 44.

The disengaging means 84 comprises a lever 86 attached to the support member 18 and moveable between a first position (FIG. 5) in which the lever 86 coacts between the support member 18 and the locking means 38 to continuously maintain the locking means 38 in the disengaged condition in opposition to the biasing force of the spring 50. The lever 86 is also movable to a second position (FIG. 1) in which the lever 86 is disposed free from interaction with the locking means 38 to permit the spring 50 to force the locking means 38 into the engaged condition.

The support member 18 includes a pair of ears 88, 90 disposed on opposite sides of the button 44. The ears 88, 90 extend radially outwardly from the support member 18 in parallel fashion to distal free ends thereof. Pivot connection means 91 are provided for pivotally connecting the lever 86 and support member 18. The pivot connection means 91 comprises a pair of pivot pins 92, 94 extending laterally of the lever 86 from opposite side edges thereof and received in a complimentary pair of apertures 96, 98 formed in each of the ears 88, 90 respectively. The apertures 96, 98 are disposed in the ears 98, 90 intermediate the distal ends of the ears 88, 90 and the button 44 and completely surround the pivot pins 92, 94. The ears 88, 90 are provided with a pair of guide slots 100, 102 extending from the distal ends of the ears 88, 90 and toward each of the respective apertures 96, 98. The guide slots 100, 102 are used to guide the insertion of the pivot pins 92, 94 into their respective apertures 96, 98 during assembly. The guide slots 100, 102 are tapered in depth such that the spacing between the bottom of the guide slots 100, 102 is greatest at the distal ends of the ears 88, 90 and continually decreases toward the apertures 96, 98. The tapered guide slots 100, 102 coact with the pivot pins 92, 94 to spread the ears 88, 90 as the pivot pins 92, 94 are introduced in the guide slots 100, 102 and forced along the length of the guide slots 100, 102 toward the apertures 96, 98. The guide slots 100, 102 terminate within the ears 88, 90 at a position intermediate the distal ends of the ears 88, 90 and the apertures 96, 98. That is, the depth of the guide slots 100, 102 decreases to zero at a position along the guide slots 100, 102 just prior to reaching the apertures 96, 98.

The lever 86 further includes an engaging surface 104 spaced from the pivot pin 92, 94 on one end of the lever 86. The engaging surface 104 acts on the button 44 upon movement of the lever 86 from the second position (FIG. 1) to the first position (FIG. 5) to depress the button 44 and thereby disengage the locking portion 40 of the locking means 38 from the slider member 26 The engaging surface 104 includes a retaining portion 106, such as a flat 106, which acts on the button 44 in opposition to the spring 50 to retain the lever 86 in the first position. The retaining portion 106 provides stability to the lever 86 by resisting movement of the lever 86 from the first position once positioned. That is, the flat retaining portion 106 coacting against the flat, upper surface of the spring-biased button 44 stabilizes the lever 86 for resistance against movement from the first position In this manner, the locking means 38 is able to be maintained in the disengaged position independent of an application of any external forces to the assembly 10. An operator need not continuously express the button 44 with his thumb to maintain the locking means 38 in the disengaged condition. While in this disengaged position, adjustment and readjustment of the conduit 12 can be achieved by simply sliding the slider member 26 in one direction or the other within the passageway 24 of the support member 18. Once properly adjusted, the operator simply moves the lever 86 to the second position to permit the coil spring 50 to bias the locking means 38 into the engaged condition with the slider member 26 and thereby lock the assembly 10 in the adjusted condition.

In order to make it easier for the operator to control the positioning of the lever 86, the lever 86 is provided with a tail 108 defining an end to the lever 86 opposite the engaging surface 104. When positioned in the second position (FIG. 1), the tail 108 of the lever 86 extends beyond the ears 88, 90. That is, the tail portion 108 extends beyond the side edges of the ears 88, 90 when in the second position. The extended tail portion 108 is easily grasped by the operator for movement of the lever 86 to the first position (FIG. 5). When the lever 86 is in the first position, the ears 88, 90 extend beyond the tail portion 108 of the lever 86. This permits the assembly 10 to be shipped and handled with the lever in the first position and thus the locking means 38 in the disengaged condition and minimizes the chances of the lever 86 being inadvertently moved to the second position causing the locking means 38 to become engaged with the slider member 26 The ears 88, 90 thus serve as a guard for the lever 86 when in the first position.

The support member 18, locking member 38, slider member 26 and disengaging means 84 are preferably fabricated from fairly rigid organic polymeric materials.

An alternative mid-conduit style conduit length adjustor assembly constructed in accordance with the present invention is generally shown at 10' in FIG. 6, wherein like numerals are used to identify like features and a prime is used to designate reference to the alternative embodiment. This alternative embodiment 10' is the same as the first embodiment 10 except that it includes conduit connection means 110' for connecting the support member 18' to an additional section of conduit 112'. The conduit connection means 110' comprises a pair of fingers or claws 114' disposed on opposite sides of the support member 18' and extending forwardly along the length of the support member 18' toward the conduit 112'. The fingers 114' engage an outer annular rib 116' formed on the conduit 112' to thereby interconnect the support member 18' and the conduit 112'. The conduit 112' also includes an end fitting (not shown) for attaching the conduit 112' to a support structure. The end fitting (not shown) may be of the snap-in connection type shown in the preferred embodiment at 20. Thus, the second embodiment differs only in its connection and its mid-conduit location along the length of the assembly 10'. Other like features are not shown by the represented drawing but are impliedly the same. The operation of the alternative assembly 10' is identical to the preferred embodiment.

A third embodiment of an assembly constructed in accordance with the present invention is generally shown at 10" in FIG. 7 wherein like numerals are used to identify like features among the embodiments and a double prime is used to designate reference to the third alternative embodiment. With this embodiment, the slider member 26" is molded about the end of the core element 16" rather than being fixed to the conduit as in the preferred embodiment. Thus, the assembly 10" is a core element length adjustor rather than a conduit length adjustor. The snap-in connection means 20" serves to connect the support member 18" to a control or a controlling member (not shown). The conduit 12" may also be provided with an additional end fitting 118' for connecting the conduit 12" to a support structure. As with the second embodiment, other like features are not represented by the drawing but are impliedly the same as the preferred embodiment 10. The operation of the second embodiment 10" is identical to the preferred embodiment 10 except that the adjustment in the length of the core element 16" results from movement of the slider member 26" within the support member 18" rather than an adjustment in the length of the conduit 12", as with the preferred embodiment.

The invention has been described in an illustrative manner, and it is to be understood that the terminology which has been used is intended to be in the nature of words of description rather than limitation.

Obviously, many modifications and variations of the present invention are possible in light of the above teachings. It is therefore, to be understood that within the scope of the appended claims wherein reference numerals are merely for convenience and are not to be in any way limiting and wherein like reference numerals are used to designate like features among the embodiments and primes are used to designate the various embodiments, the invention may be practiced otherwise than as specifically described.

What is claimed is

1. A motion transmitting remote control assembly (10, 10',10') comprising:
   a conduit (12, 12',12");
   a motion transmitting core element (16, 16', 16") movably supported by said conduit (12, 12',12");
   a slider member (26, 26',26") fixedly secured to one of said conduit (12, 12',12") and said core element (16, 16',16");
   support means (18, 18',18") for slideably supporting said slider member (26, 26',26") while preventing relative rotational movement therebetween;
   locking means (38, 38',38") for controlling the longitudinal sliding movement of said slider member (26, 26',26") relative to said support means (18, 18',18"), said locking means (38, 38',38") being movable between an engaged condition in which said locking means (38, 38',38") is engaged with said slider member (26, 26', 26") for preventing relative sliding movement therebetween in at least one direction and a disengaged condition in which said locking means (38, 38',38") is disengaged from said slider member (38, 38',38") for permitting relative sliding movement therebetween in both directions;
   biasing means (50, 50',50") acting on said locking means (38, 38',38") for continuously urging said locking means (38, 38',38") toward said engaged condition;
   and characterized by disengaging means (84, 84', 84") for acting against said biasing means (50, 50',50") to maintain said locking means (38, 38',38") in said disengaged condition independent of an application of external forces to the assembly (10, 10',10").

2. An assembly as set forth in claim 1 further characterized by said disengaging means (84, 84',84") comprising a lever (86, 86',86") attached to said support means (18, 18',18") and movable between a first position in which said lever (86, 86',86") coacts between said support means (18, 18',18") and said locking means (38, 38',38") to continuously maintain said locking means (38, 38',38") in said disengaged condition in opposition to said biasing means (50, 50',50") and a second position in which said lever (86, 86',86") is disposed free from interaction with said locking means (38, 38',38") to permit said biasing means (50, 50',50") to bias said locking means (38, 38',38") into said engaged condition.

3. An assembly as set forth in claim 2 further characterized by including pivot connection means (91, 91', 91") for pivotally interconnecting said lever (86, 86',86") and said support means (18, 18',18").

4. An assembly as set forth in claim 3 further characterized by said locking means (38, 38',38") comprising a locking portion (40, 40', 40") disposed between said slider member (26, 26', 26") and said support means (18, 18',18") on a first side of said slider member (26, 26', 26").

5. An assembly as set forth in claim 4 further characterized by said locking means (38, 38',38") including an integral button (44, 44',44") disposed on a side of said slider member (26, 26', 26") opposite said locking portion (40, 40', 40") and connected to said locking portion (40, 40', 40") for movement therewith.

6. An assembly as set forth in claim 5 further characterized by said lever (86, 86', 86") including an engaging surface (104, 104',104") spaced from said pivot connection means (91, 91',91") and acting on said button (44, 44',44") upon movement of said lever (86, 86', 86") from said second position to said first position to depress said button (44, 44', 44") and disengage said locking portion (40, 40', 40") from said slider member (26, 26', 26").

7. An assembly as set forth on claim 6 further characterized by said engaging surface (104, 104',104") including a retaining portion (106, 106', 106") acting on said button (44, 44', 44") in opposition to said biasing means (50, 50', 50") to retain said lever (86, 86', 86") in said first position 8. An assembly as set forth in claim 7 further characterized by said support means (18, 18', 18") including a pair of ears (88, 88', 88"; 90, 90',90") extending radially outwardly of said support means (18, 18', 18") to distal free ends thereof.

9. An assembly as set forth in claim 8 further characterized by said lever (86, 86', 86") including a tail portion (108, 108', 108") extending beyond said ears (88, 88', 88"; 90, 90',90") when said lever (86, 86', 86") is positioned in said second position.

10. An assembly as set forth in claim 9 further characterized by said ears (88, 88', 88"; 90, 90', 90") extending beyond said tail portion (108, 108', 108") when said lever (86, 86', 86") is positioned in said first position.

11. An assembly as set forth in claim 10 further characterized by said pivot connection means (91, 91', 91") comprising a pair of pivot pins (92, 92', 92"; 94, 94', 94") extending laterally of said lever (86, 86', 86") from opposite side edges thereof and received in a complimentary pair of apertures (96, 96', 96"; 98, 98', 98") provided in said ears (88, 88', 88"; 90, 90',90") spaced from said distal ends thereof.

12. An assembly as set forth in claim 11 further characterized by said ears (88, 88', 88"; 90, 90', 90") having a pair of guide slots (100, 100', 100"; 102, 102', 102") extending from said distal ends of said ears (88, 88', 88"; 90, 90', 90") toward said pair of apertures (96, 96', 96"; 98, 98', 98"), said guide slots (100, 100', 100"; 102, 102', 102") being tapered for coacting with said pivot pins (92, 92', 92"; 94, 94', 94") of said lever (86, 86', 86") to spread said ears (88, 88', 88"; 90, 90', 90") as said pivot pins (92, 92', 92"; 94, 94', 94") are moved along said guide slots (100, 100', 100"; 102, 102', 102") toward said apertures (96, 96', 96"; 98, 98', 98").

13. An assembly as set forth in claim 12 further characterized by said guide slots (100, 100', 100"; 102, 102', 102") terminating in said ears (88, 88', 88"; 90, 90', 90") at a position intermediated said distal ends of said ears (88, 88', 88"; 90, 90', 90") and said apertures (96, 96', 9641; 98, 98', 98").

14. An assembly as set forth in claim 13 further characterized by said slider member (26, 26') being connected to said conduit (12, 12').

15. A motion transmitting remote control assembly comprising:

a conduit, (12, 12', 12");

a motion transmitting core element (16, 16', 16') movably supported by said conduit (12, 12', 12");

a slider member (26, 26', 26") fixedly secured to one of said conduit (12, 12', 12") and said core element (16, 16', 16");

a support member (18, 18', 18") defining a longitudinal passageway (24, 24', 24") extending completely through said support member (18, 18', 18"), said slider member (26, 26', 26") being supported in said passageway (24, 24', 24") for longitudinal movement relative to said support member (18, 18', 18"), said support member (18, 18', 18") and said slider member (26, 26', 26") including coacting surfaces which prevent said slider member (26, 26', 26") from rotating with respect to said support member (18, 18', 18"), said support member (18, 18', 18") defining a cavity (42, 42', 42") having a bottom spaced from one side of said slider member (26, 26', 26");

a locking member (38, 38', 38") having a locking portion (40, 40', 40") disposed in said cavity (42, 42', 42") adjacent said one side of said slider member (26, 26', 26"), said locking member (38, 38', 38") further including a button (44, 44', 44") operatively connected to said locking portion (40, 40', 40") and disposed on a side of said slider member (26, 26', 26") opposite said locking portion (40, 40', 40"), said locking member (38, 38', 38") defining an aperture (49, 49', 49") surrounding said slider member (26, 26', 26") and permitting said slider member (26, 26', 26") to pass therethrough, said locking member (38, 38', 38") being movable between an engaged condition in which said locking portion (40, 40', 40") of said locking member (38, 38', 38") is engaged with said slider member (26, 26', 26") to prevent movement of said slider member (26, 26', 26") in at least one direction relative to said support member (18, 18', 18") and a disengaged condition in which said locking portion (40, 40', 40") of said locking member (38, 38', 38") is moved into said cavity (42, 42', 42") and is disengaged from said slider member (26, 26', 26") to permit movement of said slider member (26, 26', 26") in either direction with respect to said support member (18, 18', 18");

a coil spring (50, 50', 50") disposed in said cavity (42, 42', 42") and reacting between said bottom of said cavity (42, 42', 42") and said locking portion (40, 40', 40") of said locking member (38, 38', 38") to continuously urge said locking member (38, 38', 38") toward said engaged condition;

and characterized by a lever (86, 86', 86") pivotally supported in a pair of ears (88, 88', 88"; 90, 90', 90") extending radially outwardly from said support member (18, 18', 18") on opposite sides of said button (44, 44', 44") and including an engaging surface (104, 104', 104"), said lever (86, 86', 86") being movable between a first position in which said engaging surface of said lever (86, 86', 86") interacts with said button (44, 44', 44") of said locking member (38, 38', 38") to depress said button (44, 44′, 44″) and thereby position said locking portion (40, 40′, 40″) of said locking member (38, 38′, 38″) in said disengaged condition in opposition to said spring (50, 50′, 50″) and a second position in which said engaging surface (104, 104′, 104″) of said lever (86, 86′, 86″) is disposed free from interaction with said button (44, 44′, 44″) to permit said spring (50, 50′, 50″) to position said locking portion (40, 40′, 40″) of said locking member (38, 38′, 38″) in said engaged condition, said engaging surface (104, 104′, 104″) including a retaining portion (106, 106′, 106″) coacting with said button (44, 44′, 44″) to retain said lever (86, 86′, 86″) in said first position.

* * * * *